United States Patent [19]
Engel

[11] 3,807,423
[45] Apr. 30, 1974

[54] FUEL LINE POSITION-RESPONSIVE SHUT-OFF VALVE

[75] Inventor: Joachim H. Engel, Okemos, Mich.

[73] Assignee: General Motors Corporation, Detroit, Mich.

[22] Filed: Sept. 5, 1972

[21] Appl. No.: 286,071

[52] U.S. Cl. .................................. 137/38, 180/104
[51] Int. Cl. ....................... B60k 27/08, F16k 17/36
[58] Field of Search .............. 137/38, 39, 351, 456; 180/103, 104

[56] References Cited
UNITED STATES PATENTS
| | | | |
|---|---|---|---|
| 1,302,749 | 5/1919 | Yeamens | 137/38 |
| 2,619,185 | 11/1952 | Rudisill | 180/104 |

*Primary Examiner*—Robert G. Nilson
*Attorney, Agent, or Firm*—William S. Pettigrew

[57] ABSTRACT

A position responsive shut-off valve for use in a vehicle fuel system for stopping the flow of fuel from the fuel tank to the engine when the valve is tilted a predetermined amount from its normal upright position. The valve includes a housing having an inlet opening and an outlet opening formed therein and also a shuttle member which is maintained in a first position by a weight when the valve is upright and is movable by a spring to a second position when the valve is tilted. A passage is formed in the shuttle member so when the latter is in a first position, the passage serves to connect the inlet opening with the outlet opening and allows fuel to be drawn to the engine. When the shuttle member is in a second position, a spring-biased ball moves into the outlet opening and serves as a detent as well as a closure so as to discontinue supply of fuel to the engine.

3 Claims, 4 Drawing Figures

PATENTED APR 30 1974  3,807,423

FUEL LINE POSITION-RESPONSIVE SHUT-OFF VALVE

This invention pertains to a valve in general and more particularly concerns a position-responsive shut-off valve for use in a conduit for stopping the flow of fluid therethrough when the valve is tilted from an upright positon to a predetermined inclined position.

A principal object of this invention is the provision of a shut-off valve of the aforedescribed type for use in a vehicle fuel system for preventing the fuel pump from drawing fuel from the fuel tank when the vehicle is located in an extreme tilted position or is completely inverted. Another object of this invention is to provide a shut-off valve having a housing that is made from a plastic material and has a vertically orientated shiftable member located therein which is biased upwardly by a spring and is normally held in an operative position by a weight located in the upper end of the housing. A further object of this invention is to provide a position responsive shut-off valve which includes a shuttle member having a spring-biased ball which serves as a closure member to block flow of fluid through the valve when the latter is tilted a predetermined amount. A still further object of this invention is to provide a fluid shut-off valve which when in a normal upright position has a weight for maintaining the valve open to allow fluid flow therethrough and when tilted a predetermined amount allows a spring to overcome the weight and position a shuttle member into a blocking position so as to stop the flow of fluid through the valve.

The above object and others are realized by a valve which in its preferred form comprises an elongated housing having an inlet opening and an outlet opening both of which are located along an axis transverse to the longitudinal axis of the housing. A shuttle member is slidably mounted in the housing and divides the latter into an upper chamber and a lower chamber. The shuttle member has a passage formed therethrough for connecting the inlet opening with the outlet opening when the shuttle member is in a first position and also includes a spring-biased ball for simultaneously detenting the shuttle member and blocking the outlet opening when the shuttle member is in a second position. A spring is provided in the lower chamber for biasing the shuttle member upwardly towards the second position and a weight in the form of a steel ball is located in the second chamber for maintaining the shuttle member in the first position against the bias of the spring in the lower chamber when the valve is in a normal upright position with its longitudinal axis located in a vertical plane. When the valve is tilted from its normal position to a predetermined inclined position, the weight of the steel ball is overcome by the spring in the lower chamber so as to cause the shuttle member to be shifted to the second position and thereby stop the flow of fluid through the valve.

A more complete understanding of this invention will be derived from the following detail description when taken with the drawing in which.

Figure 1:
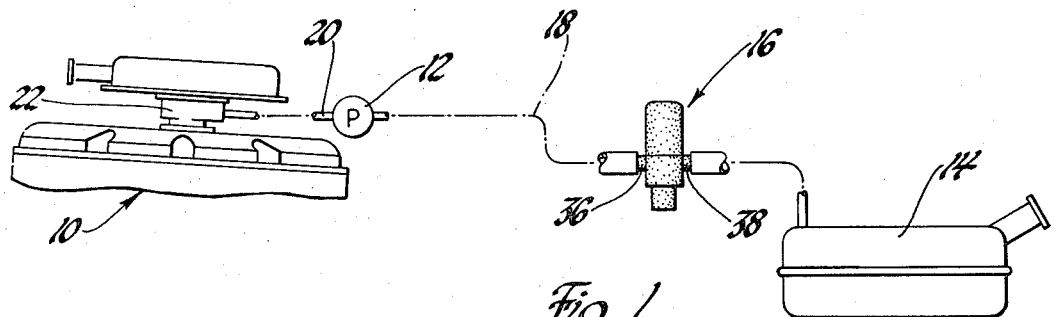
FIG. 1 shows a fuel system for an internal combustion engine that incorporates a shut-off valve made according to this invention.

Referring to the drawing and more particularly FIG. 1 thereof an engine fuel system is shown which is intended for use in an automotive vehicle (not shown) and includes an internal combustion engine 10, a fuel pump 12, fuel tank 14, and a position responsive shut-off valve 16 made according to the invention. As can be seen the fuel pump 12 is adapted to draw fuel from the fuel tank 14 through a fuel line or conduit 18 and supply the fuel through a line or conduit 20 to the carburetor 22 of the engine 10. The shut-off valve 16 is located in the fuel line 18 and serves to provide a fluid connection between the fuel pump 12 and the fuel tank 14 when the valve is in the normal upright position shown in FIG. 1. If, however, the vehicle and accordingly the shut-off valve 16 should be tilted a predetermined amount in any direction, the valve 16 is adapted to block the fuel line 18 and thereby prevent the fuel pump 12 from drawing fuel from the fuel tank 14.

Figure 2:
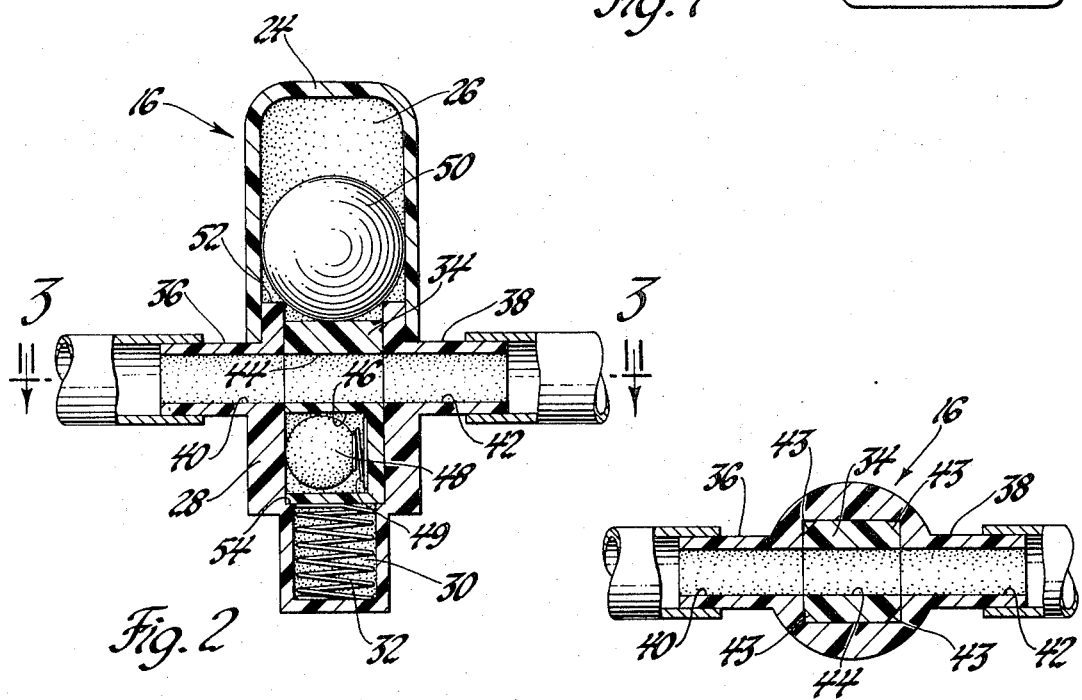
FIG. 2 is an enlarged cross-sectional view showing the shut-off valve and the detailed parts thereof.
Figure 3:
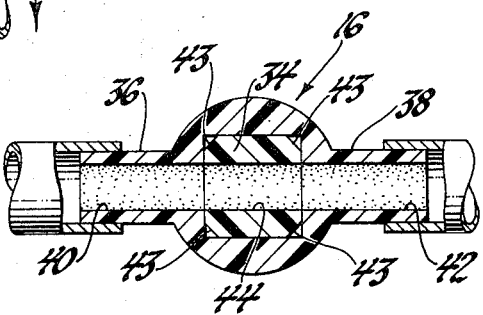
FIG. 3 is a sectional view taken on line 3—3 of FIG. 2.

More specifically and as seen in FIGS. 2 and 3, the shut-off valve 16 includes a housing formed from a gasoline resistant plastic and comprising a cylindrical head portion 24 which defines an upper chamber 26 and a body portion 28 which defines a lower chamber 30. The lower chamber 30 supports a coil spring 32 and a shuttle member 34 the latter of which is slidable relative to the body portion 28. The body portion 28 also has a pair of axially aligned and outwardly projecting fittings 36 and 38 formed therewith which respectively are provided with fluid outlet and inlet openings or passages 40 and 42.

As seen in FIG. 3, the shuttle member 34 is generally rectangular in cross-section with each corner having a beveled surface 43 so as to provide four passages through which fluid can flow between the chambers 26 and 30. As best seen in FIG. 2, the shuttle member 34 also includes a throughpassage 44 below which is provided a dead-end bore 46 accommodating a nylon ball 48 biased in an outwardly direction by a coil spring 49. A weight 50 in the form of a steel ball is located in the upper chamber 26 on the head portion 24 and is of a diameter slightly smaller than the diameter of the chamber 26 so as to provide a small clearance between the ball and the inner wall of the chamber. The weight 50 is adapted to contact the upper end of the shuttle member 34 and maintain it in the position shown against the bias of the coil spring 32 located in the lower chamber 30. In this regard, it will be noted that the weight 50, in the FIG. 2 position, rests on an upwardly projecting neck 52 which is integral with the body portion 28 and serves as the means for sealingly and fixedly joining the head portion 24 to the body portion 28.

Figure 4:
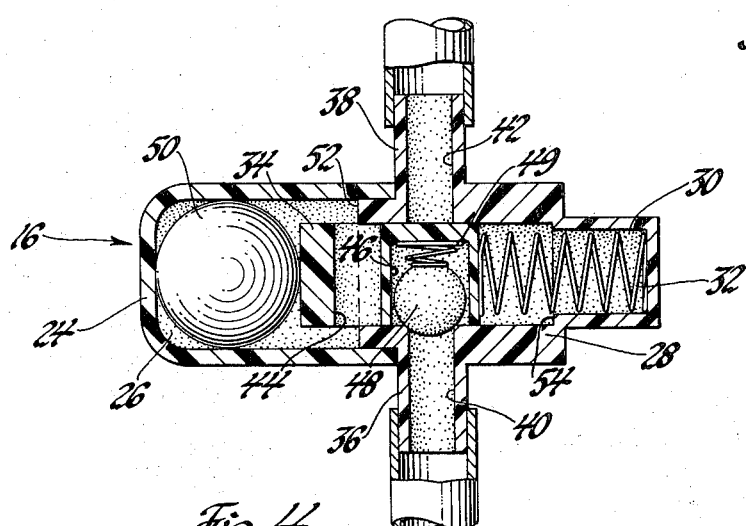
FIG. 4 is a view showing the shut-off valve located in a tilted position.

Thus as seen in FIG. 2, the valve 16 is located in the normal upright position with the weight 50 maintaining the shuttle member 34 in its lowered position so that the passage 44 registers with the similarly sized outlet and inlet passages formed in the fittings 36 and 38. In such position, the valve 16 is opened permitting the fuel pump 12 to draw fuel from the fuel tank 16. When, however, the vehicle and accordingly valve 16 is tilted in any direction a predetermined amount, the force component of the weight 50 acting on the shuttle member 34, in effect moves away from axial alignment with the shuttle member and accordingly permits the spring 32 to shift the shuttle member 34 towards the head portion 24. As the valve 16 is tilted further from the normal upright position, for example to a position as seen in FIG. 4, the spring force of spring 32 causes the shuttle member 34 to move to the position shown. At this time, the nylon ball 48 has a portion which moves into the outlet passage 40 so as to detent the shuttle member 34 in position and simultaneously block the outlet passage 40. As a result, the fuel line leading to the engine 10 is blocked and, as should be apparent, the pump suction augments the force of the spring 49 to draw the ball 48 into the blocking position.

From the above description, it should be apparent that the weight of the steel ball as well as the strength of the spring 32 will determine the point at which the shuttle member 34 is shifted from the open position of FIG. 2 to the closed position of FIG. 4 when the valve is tilted. In one valve construction made according to the invention, it was found that the shuttle member 34 would close when the valve was tilted in any direction at an angle of approximately 70° to 80° and would open automatically at an angle of less than 45°. In a vehicle fuel system, the aforesaid tilt angles should be satisfactory, however, for other uses a lesser tilt angle can be obtained by either increasing the strength of spring 32 or decreasing the size and accordingly the weight of the steel ball. In addition, it will be understood that the shuttle member 34 should be sized so it corresponds in outer configuration with its accommodating chamber without restricting sliding movement of the shuttle member. Also, the chamber 30 may have stop portions for maintaining the shuttle member in a proper relative location when in the open position of FIG. 2. For example, the shuttle member 34 can be seated on stop portions such as the shoulder 54 formed with the body portion 28 to assure that the passage 44 registers properly with passages 40 and 42. It will also be understood, that when in use in a fluid system such as the fuel system shown in the drawings, the entire interior of the valve 16 is normally filled with the fluid passing through the valve. Thus the chamber 26 would have fuel therein and because of the small clearance between the steel ball and the inner wall of the chamber 26, inertial movement of the steel ball is dampened while the vehicle is being driven without impairing the ability of the steel ball to move and displace the fuel from the upper chamber 26 to the lower chambet 30 when the valve is tilted as aforedescribed.

I claim:

1. A position responsive shut-off valve for use in a vehicle fuel system including a fuel line which has one end connected to a fuel pump that feeds fuel to an engine and the other end connected to a fuel tank, the valve being located in said fuel line between said fuel pump and said fuel tank and comprising an elongated housing, a shuttle member in said housing dividing the latter into an upper chamber and a lower chamber, said shuttle member having a passage for connecting the fuel pump with the fuel tank when the shuttle member is in a first position and having a spring-biased ball for blocking the fuel line and preventing the fuel pump from drawing fuel from the fuel tank when the shuttle member is in a second position, a spring in the lower chamber biasing the shuttle member into the second position, and a weight located in the upper chamber for contacting the shuttle member and maintaining the latter in the first position against the bias of said spring when the valve is in the normal upright position and adapted to be displaced relative to the housing when the valve is tilted in any direction a predetermined amount so as to cause said spring in the lower chamber to move the shuttle member to the second position.

2. A position responsive shut-off valve for use in a conduit for stopping the flow of fluid therethrough comprising an elongated housing having an inlet opening and an outlet opening located in a plane transverse to the longitudinal axis of the housing, a shuttle member slidably mounted in said housing and dividing the latter into an upper chamber and a lower chamber, said shuttle member having a passage formed therein for connecting the inlet opening with the outlet opening when the shuttle member is in a first position and having a spring-biased ball for blocking said outlet opening when the shuttle member is in a second position, a spring in the lower chamber biasing the shuttle member upwardly toward the second position, and a weight located in the second chamber for maintaining the shuttle member in the first position against the bias of the spring in the lower chamber when the valve is in a normal upright position and adapted to be displaced relative to the housing when the latter is tilted a predetermined amount from its normal position so as to allow said spring to shift the shuttle member to the second position.

3. A position responsive shut-off valve for use in a conduit for stopping the flow of fluid therethrough comprising an elongated housing having an inlet opening and an outlet opening axially aligned along an axis transverse to the longitudinal axis of the housing, a shuttle member slidably mounted in said housing and dividing the latter into an upper chamber and a lower chamber, said shuttle member having a passage formed therein for connecting the inlet opening with the outlet opening when the shuttle member is in a first position and having a dead-end bore formed therein for accommodating a spring-biased ball which is adapted to simultaneously detent said shuttle member and block said outlet opening when the shuttle member is in a second position, a spring in the lower chamber biasing the shuttle member upwardly toward the second position, the upper chamber being circular in cross-section and a spherical weight of substantially the same cross-sectional size being located in the upper chamber for maintaining the shuttle member in the first position against the bias of the spring in the lower chamber when the valve is in a normal upright position, said spherical weight adapted to be displaced relative to the housing when the latter is tilted a predetermined amount from its normal position so as to allow said spring in the lower chamber to shift the shuttle member to the second position.

* * * * *